No. 738,301. PATENTED SEPT. 8, 1903.
J. DOWD.
PRESERVING BASKET.
APPLICATION FILED NOV. 2, 1901.

NO MODEL.

WITNESSES:
T. J. Coleman
M. Olive Williams

INVENTOR
Jay Dowd
BY
Beach & Fisher
ATTORNEYS

No. 738,301.

Patented September 8, 1903.

UNITED STATES PATENT OFFICE.

JAY DOWD, OF MADISON, CONNECTICUT.

PRESERVING-BASKET.

SPECIFICATION forming part of Letters Patent No. 738,301, dated September 8, 1903.

Application filed November 2, 1901. Serial No. 80,931. (No model.)

*To all whom it may concern:*

Be it known that I, JAY DOWD, of the town of Madison, county of New Haven, State of Connecticut, have invented a new and useful Improvement in Preserving-Baskets, of which the following is a full, clear, and exact description, when taken in connection with the accompanying drawings, which form a part thereof, and in which—

Figure 1:
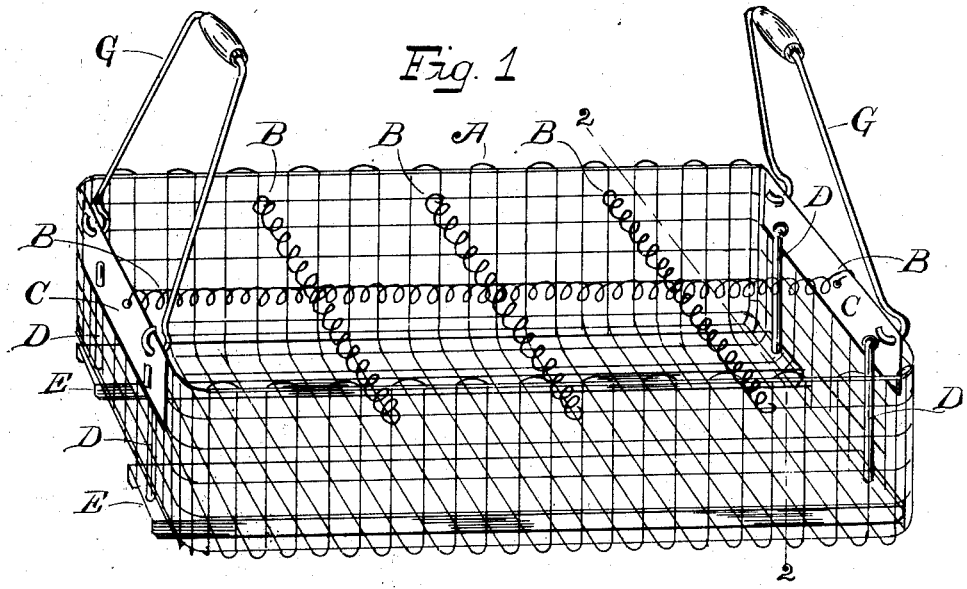
Figure 2:
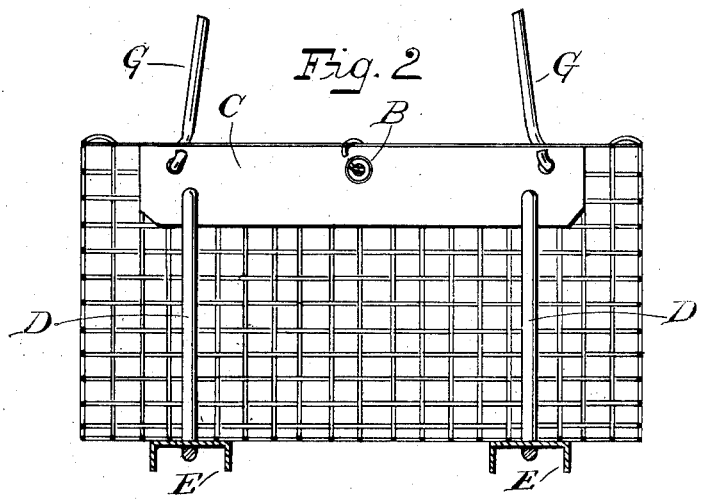

Figure 1 is a view in perspective of my improvement; and Fig. 2 represents a vertical cross-section on line 2 2 of Fig. 1, showing system of bracing in a basket embodying my invention.

In both figures similar letters of reference represent like parts.

My invention relates to an improved means for holding jars of fruit or vegetables in the process of preserving the fruits and vegetables while partially immersing the jars in a boiler.

The object of my invention is the production of a novel, simple, and efficient holder for jars of fruit, vegetables, and other substances, having the various improvements and combinations of parts set forth and claimed hereinafter.

Referring to the drawings for a more particular description, the parts designated by letter A represent the basket open at top and divided across the top by crimped or coiled wire springs B into compartments. The partitions being made from crimped or coiled wire, flexibility is given to the divisions, thus permitting cans of various sizes to be placed in the basket simultaneously. The partitions may be strung across said basket either longitudinally or transversely. By stringing them both longitudinally and transversely an expansion of the divisions in two directions is made possible. Also by having crimped or corrugated partitions the jars are held farther apart than with simple straight wire and with little or no danger of their touching each other.

The bails or handles G may be attached to sheet-metal end pieces C, to which may be attached the upright rods D, which in their turn are attached to the bottom stays or braces E, extending the full length of the basket, thus forming a continuous line of connected braces from bail to bail, thereby giving strength and rigidity to the whole basket.

The bottom longitudinal stays or braces are strips of metal having their longitudinal edges turned downward, (or inverted-U-shaped in cross-section,) thus strengthening them, and thereby greatly stiffening said basket and giving each jar a firm foundation, also elevating them above any heated or cold surface upon which the basket may be placed.

The danger of breaking the cans by coming in contact with partitions of different temperature is eliminated by making said partitions from a single piece of crimped or coiled wire, which also makes it possible to place cans of the same or of various sizes in the basket at once.

The holder full of hot cans may be safely taken out and cooled at one time, the partitions being wide, and the wire of which they are formed being small little or no heat is carried from one to another. The bottom stays make a firm rest for each can, so that any motion of the boiling water cannot cause the cans to tilt or slop, and also elevate the cans so that any heat at the bottom cannot break them.

I do not limit myself to the exact construction shown and described, but hold myself at liberty to make such departures therefrom as fairly fall within the spirit and scope of my invention.

Having substantially described my invention, what I claim as new, and desire to secure by Letters Patent, is—

1. In a preserving-basket or kindred instrumentality, the combination with a basket open at the top; partitions consisting of wires coiled throughout their length and extending across said basket both longitudinally and transversely, substantially as described.

2. In a preserving-basket, or kindred instrumentality, the combination with a basket open at the top; of an interior partition formed of a single wire bent so as to make the partition throughout of a width greater than the diameter of the wire, substantially as described.

3. In a preserving-basket, or kindred instrumentality, the combination with a basket open at the top; of longitudinally-arranged sheet-metal braces inverted-U-shaped in cross-section on the bottom of the basket and so arranged as to give each can or jar a firm foundation, and to elevate the whole above any surface upon which it is placed, substantially as described.

4. A preserving-basket, or kindred instrumentality, consisting of an open basket, and having bails attached to sheet-metal end plates located at the upper edge of the ends of said basket; metal uprights, having one end attached to the end plates, and the other attached to inverted-U-shaped sheet-metal braces extending the entire length of the bottom of the basket, and connected with the opposite uprights, thus forming a continuous line of bracing from bail to bail, substantially as described.

In witness whereof I have hereunto set my hand on the 7th day of October, 1901.

JAY DOWD.

Witnesses:
J. MYRON HULL,
WM. S. HULL.